Figure 1:
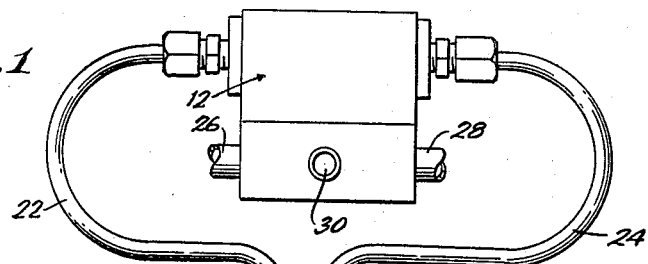

July 26, 1960

T. E. MEAD 2,946,346

CAM-EQUIPPED CONTROL DEVICE AND DRIVE THEREFOR

Filed June 10, 1955

2 Sheets-Sheet 1

INVENTOR:
Theodore E. Mead,
BY
Dawson, Tilton & Graham,
ATTORNEYS.

July 26, 1960
T. E. MEAD
2,946,346
CAM-EQUIPPED CONTROL DEVICE AND DRIVE THEREFOR
Filed June 10, 1955
2 Sheets-Sheet 2
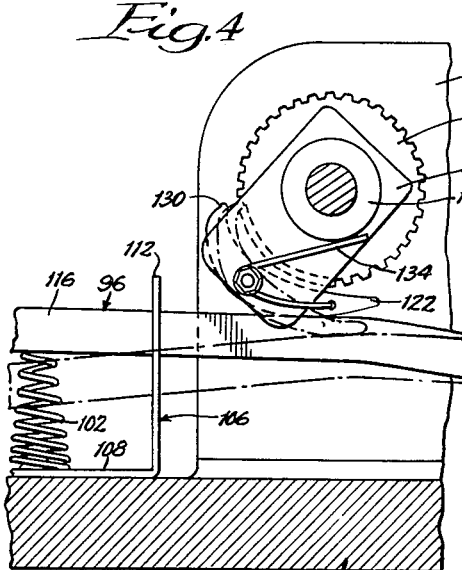
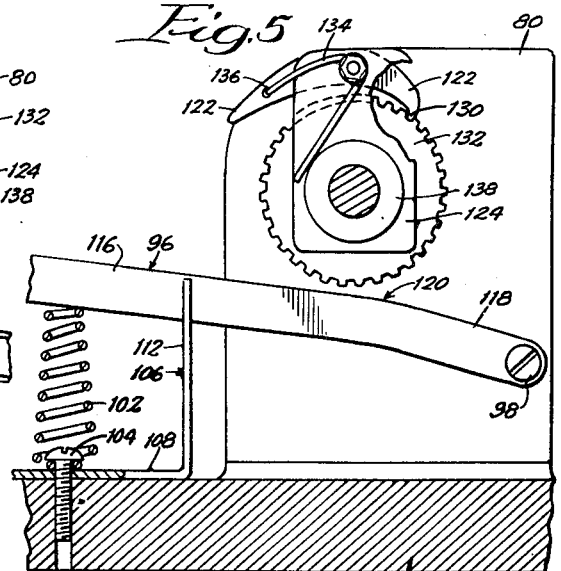
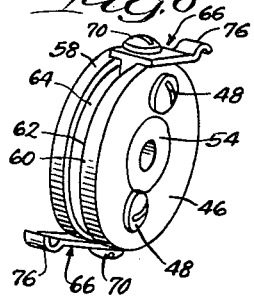
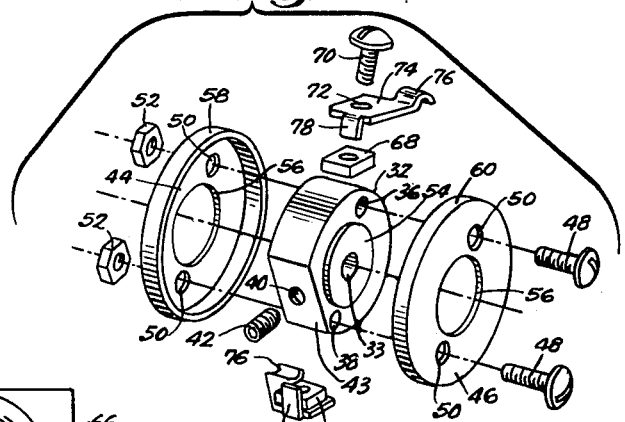
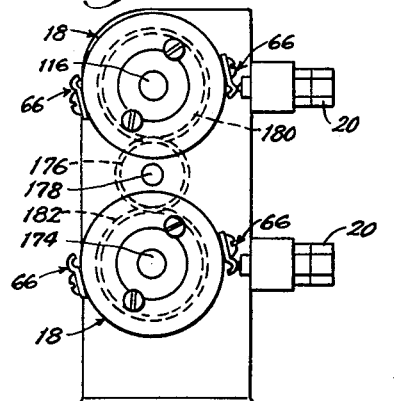
INVENTOR:
Theodore E. Mead,
BY
Dawson, Tilton & Graham,
ATTORNEYS United States Patent Office 2,946,346
Patented July 26, 1960

2,946,346

CAM-EQUIPPED CONTROL DEVICE AND DRIVE THEREFOR

Theodore E. Mead, Wilmette, Ill., assignor to Mead Specialties Company, Inc., Chicago, Ill., a corporation of Illinois Filed June 10, 1955, Ser. No. 514,604

6 Claims. (Cl. 137—622)

This invention relates to a cam-equipped control device and drive therefor useful in electro-pneumatic timers, and more particularly to an electro-pneumatic timer or indexing mechanism having adjustable cam elements affording precise adjustment and sequencing of valve elements controlling the operations of a machine tool.

Among the machines using indexing mechanisms are air cylinders, milling machines, drill presses and, in general, any machine whose cycle is determined by the position of a moving part. When the cycle of such a machine is changed to provide a different set of operations, it is generally necessary with indexing machines currently in use to make extremely complex adjustments, or even to design a new timing means.

It is, accordingly, an object of the present invention to provide a cam affording increased flexibility and a wide range of applications in indexing machines, to which one or more contoured contact or camming elements may adjustably be secured for extremely simple and accurate timing adjustments.

Another object is to provide a cam shaft having a plurality of cams secured thereto for relative angular adjustment. Another object is to provide an electro-pneumatic timer of the type indicated having a bank of limit valves adapted to be operated in pairs by the cams in predetermined sequential relationship, whereby to actuate a plurality of pneumatic control elements in the timed relation thus established.

Another object is to provide a clutch means adapted to provide manual engagement and disengagement between the cam shaft and an electric motor to afford accurate control over the number of cycles of operation to be performed.

Another object is to provide a clutch of the type indicating having complementary camming elements which are adapted to provide precisely one more cycle or revolution of the cam shaft after manual setting of the clutch, whereby to afford an even greater degree of accuracy of control over the number of cycling operations.

Another object of the invention is to provide latching means for the clutch adapted to effect the foregoing objectives in simple and reliable fashion. Another object of the invention is to provide means for variable speed of operation of the indexing mechanism including a slidable mounting of the prime mover to afford adjustment in gear ratios for said mechanism.

Other objects include provision of a cam adapted to actuate substantially any desired number of elements of a machine tool in predetermined relationship which is simple and economical to manufacture, and may be readily assembled and disassembled for cleaning or repair purposes; and to provide an indexing mechanism utilizing the said cams in combination with pairs of limit valves for each cam which are adapted to reciprocate a slide valve for pneumatic control of the individual operations in a machine's cycle.

Figure 2:
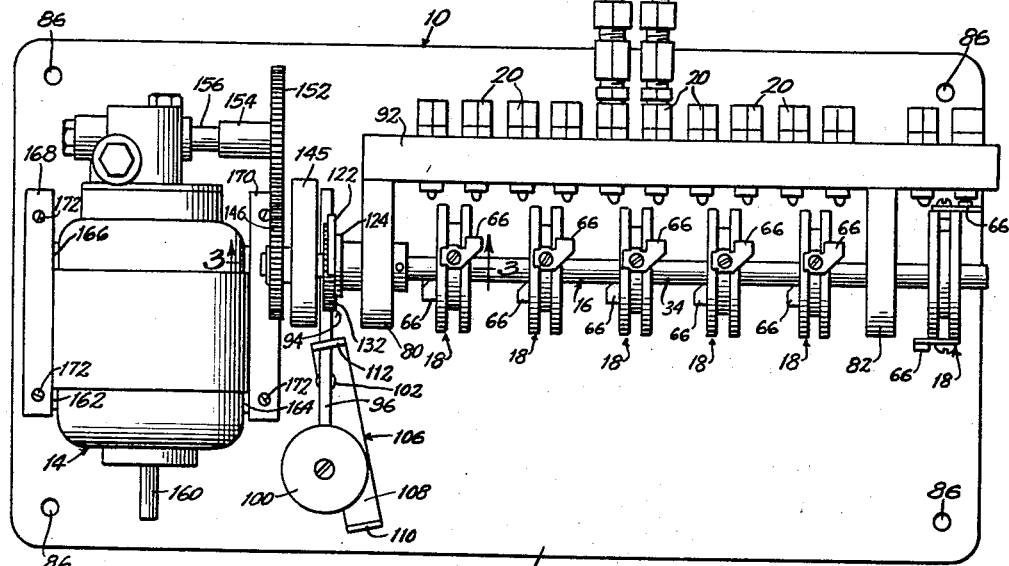
Figure 2:
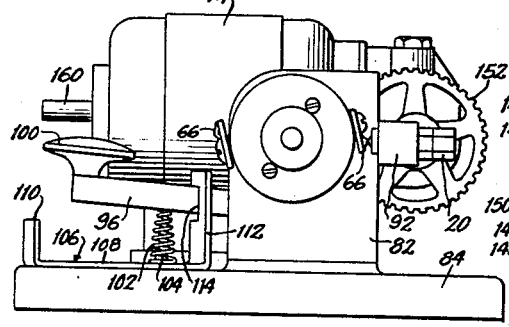
Figure 3:
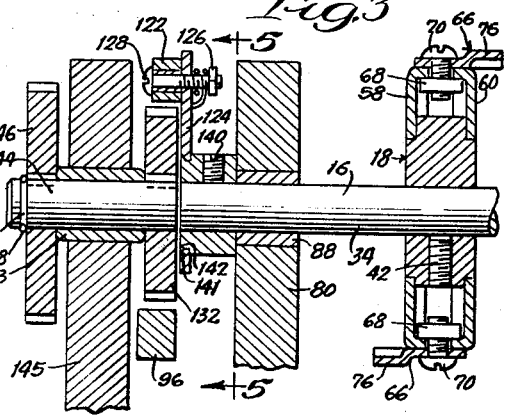

Other objects will become apparent as the description proceeds with reference to the drawings, in which:

Figure 1 is a top plan view of an indexing machine according to the present invention; Figure 2 is a side elevational view thereof; Figure 3 is a vertical sectional view of the clutch and cam of the invention; Figures 4 and 5 are enlarged fragmentary views of the clutch taken along line 5—5 of Figure 3, the disengaged position of the clutch being seen in solid line and the engaged position in dot and dash in Figure 4, and the engaged position being seen in Figure 5; Figure 6 is a perspective view of the cam of the invention; Figure 7 is an exploded perspective view of the cam; and Figure 8 is a side elevational view of yet another embodiment of the invention.

Referring now to Figure 1, an electro-pneumatic indexing mechanism 10 according to the present invention is disclosed in operative connection with a pneumatic slide valve 12 adapted for use in effecting an individual operation in the cycle of a machine of the type indicated.

The indexing mechanism 10 includes an electric motor 14 adapted to rotate the cam shaft 16 through a gear train and clutch means to be described.

A plurality of cams 18 are disposed in spaced apart relation on the cam shaft 16, and each cam 18 is in substantial registration with a pair of limit valves or poppet valves 20 adapted to be actuated thereby. The poppet valves, in turn, are adapted to exhaust respectively one side or the other of the pneumatic slide valve 12 through the conduits 22 and 24 respectively, so that the piston (not shown) of the valve 12 will reciprocate and open first the conduit 26 and then the conduit 28 to air pressure entering through port 30, whereby to effect operation of a machine tool (not shown) to which the conduits 26 and 28 are connected.

It will be appreciated that a plurality of slide valves corresponding to slide valve 12 may be provided, one for each pair of poppet valves 20, so that a complete cycle of operation in a plurality of devices may be controlled by the indexing machine 10.

Referring now to Figures 6 and 7, the adjustable cam 18 of the invention comprises a disc portion 32 having a central bore 33 adapted to receive therethrough the axle 34 of the cam shaft 16 and, preferably, peripheral bores 36 and 38 as well as a radial bore 40 for threadedly receiving the set screw 42 whereby to adjustably secure the cam to the axle 34. It is also preferred that the disc portion 32 be provided with a chord surface 43 in order to facilitate adjustment of the stud 42.

Although the entire cam body may be formed integrally, it is preferred to provide a pair of face plates 44 and 46 which may be fastened to the disc portion 32 by means of bolts 48 inserted through apertures 50 in each of the face plates 44 and 46 to be secured with nuts 52. The disc portion 32 may have formed thereon circular bosses 54 to be engaged in complementary apertures 56 to hold the face plates against lateral movement.

The face plates 44 and 46 are of substantially greater diameter than the disc 32 and are provided peripherally with annular flanges 58 and 60 at right angles thereto, so that a channel 62 is formed circumferentially by the outer margins of the face plates 44 and 46 of relatively greater width than the keying groove 64 formed by the inwardly and oppositely turned flanges 58 and 60.

Each cam 18 has, slidably secured in the keying groove 64, camming elements 66 comprising a nut 68 having a width slightly less than channel 62 and greater than keying groove 64, a bolt 70 adapted to maintain the nut 68 in abutting relation with the underfaces of flanges 58 and 60, by means of aperture 72 in the said element, web portion 74 adapted to seat tangentially on the flanges 58 and 60 when the nut and bolt means are suitably tightened, contoured contact flange 76 offset laterally for actuating each member of a pair of valves 20 alternately as seen in Figure 1, and a depending key or guide flange 78 having a width substantially equal to keying groove 64 to resist forces which would pivot contact flange 76 out of alignment with the respective poppet valves 20.

In assembly, the cam disc 32 may be secured to axle 34 by means of set screw 42 in a desired position axially, and nut 68 disposed beneath flanges 58 and 60 either by moving the face plates 44 and 46 into position after the nut is aligned with disc 32, or by loosening the plates 44 and 46 where they have already been secured thereto. Thereupon, bolt and nut means 48 and 52 may be tightened to secure the face plate snugly against the disc 32, and bolt and nut means 68 and 70 tightened to bring the web portions 74 of contact elements 66 into a secure tangential relation to the flanges 58 and 56. The contact elements may be moved slidably to any desired position circumferentially and relative to each other on the cam, assuming a plurality of the elements 66 for each cam and likewise each of the elements 66 on one cam may be moved into any desired angular relationship to elements 66 on other cams on the camshaft. Correspondingly, it is possible to adjust the cams themselves radially to one another by loosening studs 34 by use of an Allen wrench after the cams are otherwise assembled, so that the relationship between the individual elements 66 on each cam is preserved, while their relationship to camming elements on other cams is changed.

Other methods of affording circumferentially slidable adjustment between one or more camming elements and a cam body may be utilized without departing from the concept of the invention, which comprehends various configurations of the contact elements and of the keying groove therefor, as well as various means for securing the contact elements in a fixed predetermined position circumferentially after the desired adjustment of the contact elements has been made. Likewise, variations in the configuration and mode of assembly of the cam body itself lie within the scope of the invention.

As seen in Figure 1, it is preferred that pairs of camming elements 66 be disposed on each cam 18 in diametrically opposite relationship, and with their respective contact flanges 76 oppositely turned laterally in order to afford an even lapse of time between actuation of each poppet valve in each pair 20 for smooth reciprocal action of the piston (not shown) in pneumatic valves 12. When it is desired to sequence the operations of the machine tool (not shown) controlled by the individual valves 12 in a given pattern, the phases of reciprocation for the valves 12 may be adjusted relatively by moving each of the camming elements 66 on each cam corresponding to a valve 12 whose phase is to be changed for a predetermined number of degrees in keying groove 64 and in the same direction circumferentially. Thus, the pattern may be modified accurately in any desired manner. Alternatively, the cams themselves may be rotated the desired number of degrees by loosening stud 42 and tightening it after setting.

Any desired number of contacts in any desired sequence may be made for poppet valves 20 by increasing the number of elements 66 or varying their relative positions on the individual cams. It will be appreciated that while an effective indexing mechanism for use with reciprocating valves such as 12 is formed by disposing the limit valves in pairs 20, other combinations of valves for the cams are also feasible, as for example, one valve for each cam.

As also seen in Figure 1, the cam shaft 16 is preferably journaled in a pair of upright brackets 80 and 82 mounted on a base 84 (such as may be screwed to a support through apertures 86), by means of bearings 88. The poppet valves 20 are likewise supported in appropriate alignment with the cams 18 by an elongated bar 92 bolted to the brackets 80 and 82, and suitably apertured to receive the said valves.

Referring now to Figures 1 to 5, a clutch 94 is provided for accurate manual control of the number of revolutions or cycles of cam shaft 16 driven by electric motor 14, also supported on base 84 and connected with the cam shaft by adjustable gear means as will be described.

The clutch comprises a lever 96 pivotally secured to the bracket 80 by screw means 98 or the like. The arm 96 is preferably provided with a handle 100 and is biased upwardly by the helical spring 102 secured to the base 84 by a bolt 104. The bolt 104 also serves as a pivot point for a latch 106 having a cross piece 108, upright handle flange 110 and detent 112, also preferably upright and cut-out at 114 to afford a substantially rectangular recess whose height is slightly greater than the width of the lever 96, set in a distance such as to insure that the arm 96 is securely retained therein once it is pivoted downwardly in registration therewith so that the detent 112 may swing onto it as seen in Figure 2.

Referring now to Figures 4 and 5, the lever 96 is formed so that the relatively long outer portion 116 is set at an obtuse angle to the smaller portion 118 adjacent the pivot point to provide a camming edge 120 adapted to cooperate with the rocker arm 122 for selective engagement and disengagement between motor 14 and cam shaft 16. The rocker arm is pivotally secured to a bracket 124, as seen in Figure 3, preferably by nut and bolt elements 126 and 128 and is provided at one extremity thereof with the tooth element 130. The tooth is normally biased into engagement with the gear 132, as seen in Figure 4 in dot and dash, by means of the spring 134 retained on bolt 128 and having one extension secured in an aperture 136 in the rocker arm and the other extension bearing against the hub 138. Hub 138 is preferably fixedly secured to the shaft 16 by means of a stud 140 threadedly received therein, and the bracket 124 may be locked to the hub 138 by suitable keying elements 141 and 142 as seen in Figure 3.

The gear 132 is splined to a shaft 144 journaled by means of the bearing 143 in bracket 145 in co-axial relation with shaft 16 and spaced slightly from the bracket 124. A second gear 146 is removably keyed to the shaft 144 and retained in abutting relation with bearing 143 by means of a snap ring 148 set in the annular groove 150. The gear 146 is actuated by a third gear 152 which is removably secured, preferably by a set screw extending through a sleeve 154 integrally formed therewith, to a shaft 156 adapted to be rotated by the electric motor 14.

When the arm 96 is held downwardly in the position shown in Figure 4 in dot and dash, either manually or by locking engagement with the latch 106, the camming edge 120 does not engage the arm 122 and the spring 134 maintains the arm in engagement with the gear 132, whereby it is carried by the gear through successive revolutions to continuously rotate the cam members and thereby effect a desired series of operations of a given machine tool. When the arm is moved to the position shown in Figure 5 by pivoting the latch 106 so as to release it from the arm, the camming edge 120 will engage the arm 122 in its rotary movement and will cam it away from the gear 132, as is shown in full lines in Figure 4, to terminate the rotary movement of the shaft 16 and the cam members carried thereby. It will be apparent that the spring 102, together with the mechanical advantage provided through the arm 122, provides a force of sufficient magnitude to overcome the biasing action of the spring 134.

Thus, the rocker arm 122 will be permitted to turn in engaged relation with gear 132 until the rear portion 158 of the rocker arm rides past the portion 118 of the lever 96 to be cammed out of engagement with gear 132 by the relatively horizontal portion 116 of the said arm. Alternatively, the rocker may be set initially in engaged relation with the gear 132 and in contact with arm portion 118, and rotated through only one complete cycle of operations, as described, where this is desired.

Accordingly, waste of materials and inefficiencies resulting from a fractional terminal cycle are eliminated so that the sequence made possible by adjustment of the cams 18 is uninterrupted.

Referring now to Figure 1, the motor 14 is slidably secured to the base 84 for movement axially of the shaft 160 thereof, by means of flanges 162 and 164 formed integrally on a plate 166 secured beneath the motor, the said flanges being received in slots formed by the bars 168 and 170 which may be clamped by bolts 172 to the base 84 or to ridges formed thereon.

Thus, the shaft 156 may be spaced any desired distance from shaft 144, and accordingly the gears 146 and 152 may be removed and others substituted so that any desired gear ratio between these elements may be effected.

Accordingly, the predetermined sequence afforded by the cams 18 may be run at the desired speed so that individual operations of the machine tool can be performed.

Referring to Figure 8, another embodiment of the electro-pneumatic timer of the invention utilizes a second cam shaft 174 journaled in the support brackets 80 and 82 in parallel and axial spaced relation to the cam shaft 16, having disposed thereon a plurality of cams 18 as described. A plurality of pairs of limit valves 20 are also aligned in substantial registration with each of the cams 18 on the cam shaft 174 along planes normal to the cam shaft 174 and the support bar (not shown) for the valves 20. A gear 176 is journaled in the brackets 80 and 82 by means of a shaft 178 in intermediate axial alignment with cam shafts 16 and 174, and is adapted to mesh with gears 180 and 182 on cam shafts 16 and 174 respectively. Accordingly, each of the cam shafts 16 and 174 will be driven by the same motor 14, providing for either a larger number of operations in a given machine tool or for actuation of a pair of machine tools in synchronization with each other. It will be appreciated that the clutch means and gear adjustment means of the invention may also be utilized with the shaft 174.

Applicant has thus provided an indexing mechanism in which individual limit valves or pairs of limit valves may be actuated in any desired relationship to each other and in which the sequence thus determined may be effected at any desired rate until fully completed.

It is believed to be apparent from the description presented that three distinct operating conditions are provided by the clutch assembly. When the lever is in the released position shown in Figure 5, rotation of the cam shaft 16 will be terminated when the arm 122 has been carried downwardly by the gear 132 and into engagement with the cam surface 120 of the lever. Such engagement of the lever and arm causes a release of the arm from the gear 132 because the upward force exerted by the spring 102 overcomes the biasing force of the spring 134. Thus, a condition of idle is established wherein the motor drive runs continuously but the cam shaft 16 remains stationary.

The second condition is provided when the lever 96 is held in its lowermost position by the latch 106. When the lever is locked in its down position, the arm 122 rotates without engagement thereof with the cam surface 120, and continuous rotation of the cam shaft 16 and cam members then results. Thus, a sequence of operations, as those operations are established by the cam sets, will be carried out cyclically and repetitiously by the apparatus which is controlled by the timer mechanism.

Thirdly, one complete cycle of operation is provided when the lever 96 is pressed downwardly and thereafter released. When moved to its downmost position, clearance is provided between the lever 96 and arm 122 so that the gear 132 will be effective to rotate the arm 122. Rotation of the arm through a few degrees beyond the cam surface 120 establishes a condition of clearance between the lever and the arm, so that if the lever is then released the arm must rotate through a full 360° before it again engages the lever. Thus, selectively, a single cycle of operation is provided by a momentary depressing of the lever 96.

Adjustment of the cam members is readily accomplished by simply shifting the locations of the lugs or camming elements 66, and it is noted particularly from an inspection of Figure 7 that camming elements can be added or removed from the cam members by simply loosening the screws 48 to separate the disc members 44 and 46 while the central cam portion 32 remains rigidly locked on the shaft 16.

While in the foregoing specification embodiments of the invention have been set forth in considerable detail for purposes of illustration, it will be readily apparent to those skilled in the art that numerous changes may be made in those details without departing from the spirit and principles of the invention.

I claim:

1. In combination, a drive shaft adapted to be continuously rotated, a driven shaft mounted for rotation and connected to said drive shaft by means of a clutch, discs mounted on said driven shaft and equipped with cam elements adapted to be aligned with pairs of movably-mounted valves for actuating said valves to open and closed positions, each of said discs being equipped with a peripheral groove with said cam elements releasably and adjustably secured in said groove and in spaced-apart relation, one of said cam elements extending laterally from said disc in one direction and another of said cam elements extending laterally of said disc in the opposite direction, said clutch comprising an operating lever equipped with a cam, a spring-urged detent normally connecting the driving and driven shafts, and means carried by said detent and engageable with said cam lever for releasing said detent and disconnecting said shafts when the lever is moved in one direction.

2. The structure of claim 1, in which said lever is moved by one spring and said detent is actuated by a different spring, the spring actuating the lever being stronger than the spring of the detent whereby when the lever is released, the same is moved by its spring to a position for releasing the shaft connecting detent.

3. For a pneumatic device having spaced-apart valves, a driven shaft, a disc upon said shaft adapted to move in a plane lying between said valves, said disc having a circumferential adjustment groove, cam elements secured within said groove but in spaced-apart relation, one of said elements having a laterally-extending cam adapted to engage one of said valves and the other of said elements having a cam extending in the opposite direction for engagement with the other of said valves, whereby a single cam-equipped disc is effective for selectively controlling the exhaust of pressure fluid from the pneumatic device, and means for driving said shaft, said means including a gear-equipped electric motor adapted to enter into engagement with a gear on said driven shaft through a detent-equipped rocker arm, said rocker arm normally biased to provide said engagement, and means for locking said rocker arm to prevent said engagement.

4. The structure of claim 3, in which the said rocker arm is fixed to the said driven shaft.

5. For a pneumatic tool equipped with spaced exhaust valves, a disc mounted upon a driven shaft and having a peripheral keying groove therein, a plurality of camming elements secured within said groove and supported in spaced-apart relation for sequential engagement with said valve, said disc comprising a body portion and a face plate removably secured to each side of said body portion, each of said face plates having a diameter substantially greater than the diameter of said body portion to form said peripheral keying groove, each of said face plates having integrally formed therewith a peripheral annular flange extending across said body portion in spaced-apart relation to the corresponding flange on the other of said face plates, means on each of said camming elements adapted to grip each of said flanges at a selective position circumferentially of the disc, and means for driving said shaft, said means including a gear-type clutch equipped with engagement means, said engagement means providing for a single revolution of said shaft upon momentary actuation of said engagement means.

6. For a pneumatic tool equipped with spaced exhaust valves, a disc mounted upon a driven shaft and having a peripheral keying groove therein, said disc comprising a body portion and a face plate removably secured to each side of said body portion, each of said face plates having a diameter substantially greater than the diameter of said body portion to form said peripheral keying groove, each of said face plates having integrally formed therewith a peripheral annular flange extending across said body portion in spaced-apart relation to the corresponding flange on the other of said face plates, a plurality of camming elements secured within said groove and supported in spaced-apart relation for sequential engagement with said valve, means on each of said camming elements for securing said camming elements to said flanges, each of said camming elements comprising a plate-like member mounted on said plate flanges and equipped at one end with a depending key positioned in said groove, said plate-like member having at its other end a contact flange extending tangentially of said disc and offset from the center of said groove, and means for driving said shaft, said means including a gear-type clutch equipped with engagement means, said engagement means including a member mounted on said driven shaft for selective engagement with said clutch to provide for a single revolution of said shaft upon momentary actuation of the member mounted on said driven shaft.

References Cited in the file of this patent

UNITED STATES PATENTS

| | | |
|---|---|---|
| 1,460,363 | Bethel | July 3, 1923 |
| 1,785,998 | Brooke | Dec. 23, 1930 |
| 2,017,992 | Schreiber | Oct. 27, 1935 |
| 2,132,811 | Tomkins | Oct. 11, 1938 |
| 2,350,763 | Jackson | June 6, 1944 |
| 2,387,097 | Somes | Oct. 16, 1945 |
| 2,426,779 | McDonald | Sept. 2, 1947 |
| 2,444,495 | Chase | July 6, 1948 |
| 2,470,566 | MacConnell | May 17, 1949 |
| 2,698,005 | Fouron | Dec. 28, 1954 |

FOREIGN PATENTS

| | | |
|---|---|---|
| 264,396 | Great Britain | Jan. 20, 1927 |